United States Patent Office 3,329,497
Patented July 4, 1967

3,329,497
PROCESS FOR THE MANUFACTURE OF FERROMANGANESE-SILICON
Frank H. Deadrick, Fayetteville, and John G. L. Oxaal, Alloy, W. Va., assignors to Union Carbide Corporation, a corporation of New York
No Drawing. Filed Mar. 31, 1964, Ser. No. 356,077
1 Claim. (Cl. 75—133.5)

The present invention relates to a process for producing ferromanganese-silicon. More particularly, the present invention relates to a process for producing ferromanganese-silicon from slags derived from the production of ferromanganese-alloys such as medium-carbon ferromanganese, low-carbon ferromanganese and standard ferromanganese.

Ferromanganese-silicon (60% to 66% Mn, 28% to 34% Si, bal. Fe, max. 0.05% C) is ordinarily produced by a processing technique which involves smelting a charge including manganese ore, quartzite, coal, coke, and olivine.

This method of making ferromanganese-silicon, while effective in many respects, is subject to certain disadvantages, viz.

(1) Extreme difficulty is encountered in maintaining a 28%–34% silicon level in the final alloy. Consequently this requires very close control of charge material feed rate and power input.

(2) High phosphorous contents (0.05% phosphorous or more) are common due to the fact that most commercially available manganese ores contain a significant amount of phosphorous.

(3) Efficient separation between the alloy and slag in ore reduction processes of this type is complicated and most often incomplete.

(4) For efficient operation, a furnace with a high electrode area to hearth area ratio, e.g. about 0.2, and low power density of the electrodes, about 1 kw. per in.$^2$, is required, thus limiting the rate of metal production.

(5) High process operating temperatures on the order of 2500° C. and higher are required to produce relatively high silicon alloys.

Another industrial method of manufacturing ferromanganese-silicon involves a three-step process:

(a) Smelting ferromanganese slags in a submerged arc furnace to produce a silicomanganese alloy, approximately 75% Mn, 18% Si, 4.5% Fe, and 1.5% C.

(b) Smelting quartzite and carbonaceous reducing agents in a submerged arc furnace to produce silicon metal (98.5% Si).

(c) Remelting the alloy and metal in an open bath electric furnace in proportions which will give a ferromanganese-silicon product.

This latter method, however, is subject to the following disadvantages:

(1) High production cost due to using a three-step process.

(2) Production of in-grade alloy (carbon content .05%) is low due to the high carbon content of the feed material.

(3) Requirement for three separate furnaces and ancillary equipment.

These aforementioned disadvantages, while not making the previously described processes impractical, significantly affect the flexibility and economies of the operations.

It is therefore an object of the present invention to provide a simple and low cost process for making low-carbon ferromanganese-silicon.

It is a further object of the present invention to provide a process for producing ferromanganese-silicon which utilizes by-product slags as the source of manganese.

It is another object of the present invention to provide a relatively low temperature process for the production of ferromanganese-silicon.

It is another object of the present invention to provide a process for producing low-phosphorous ferromanganese-silicon.

Other objects will be apparent from the following description and claim.

A process in accordance with the present invention for producing low-carbon ferromanganese-silicon comprises:

(1) Charging manganese-bearing material in the form of ferromanganese slag together with lime and metallic silicon to a furnace, the amount of silicon being that required to reduce substantially all of the manganese and iron values in the slag to metal plus the amount required to provide a silicon content of between 28% and 34% in an alloy with the reduced manganese and iron, (2) Heating the furnace charge to cause melting and reaction thereof, (3) Adding sufficient lime to the charge to provide a molar CaO to SiO$_2$ ratio of 0.8–1.2 in the throw-away slag which results from the furnace charge reaction, (4) And separating the product metal and throw-away slag when the manganese content of the starting ferromanganese bearing material has been lowered to about 3–5% Mn.

In the practice of the present invention ferromanganese slag which contains 20% to 28% MnO, 28% to 35% SiO$_2$, 6% to 8% Al$_2$O$_3$, 25% to 30% CaO, 1% to 3% MgO and 0.5% to 1.0 FeO is employed and is charged to a suitable furnace such as an arc furnace, either in solid form, suitably sized 4" x D, or in the molten state. Silicon metal is also charged to the furnace either in solid form suitably sized 1" x D or in a molten condition. While the use of solid charge materials is effective in the practice of the present invention, the use of molten charge material can be used to speed reaction and conserve power. However, the use of large quantities of molten materials requires more complex handling apparatus.

In either event, additional heat is supplied to the furnace so that the charge materials contained therein ultimately react in the molten state at a temperature of about 1400° C. to 1600° C. to provide a molten ferromanganese-silicon alloy product and a throw-away slag in which the manganese content is about 3–5%.

Concurrently, or subsequent to, the introduction of charge materials to the furnace, lime is introduced into the furnace so that the final throw-away slag has a lime-silica molar ratio of 0.8 to 1.2 preferably about 1.1.

The purpose in providing this lime-silica ratio is to free the MnO in the ferromanganese slag and allow it to be reduced to the metallic state. If sufficient lime is not provided the SiO$_2$ generated from the reduction reaction ties up large quantities of MnO, preventing its reduction to the metallic state and causing it to be retained in the oxide phase in the throw-away slag. In the present invention, amounts of lime which provide a ratio in excess of about 1.2 do not provide any advantage in manganese recovery and adversely effect the slag-metal volume.

A particular advantage of the present invention is that what is essentially a by-product material, e.g. ferromanganese slag, which is often a throw-away slag, can be readily processed such that about 80% of its contained manganese can be economically recovered in the form of a very low carbon, low phosphorous alloy. Moreover, the required processing is not complex and the final slag-alloy ratio is very favorable, i.e. on the order of 3 to 5 thus permitting optimum utilization of furnace capacity. A low phosphorous alloy is conveniently produced by the process of the present invention since the starting material, ferromanganese slag derived from commercial operations, is essentially free of phosphorous.

On the other hand, with processes using commercial manganese ores as a starting material, phosphorous contamination is an ever present problem.

By using metallic silicon as the reducing agent for ferromanganese slag, in the present invention, the manganese values and the minor proportion of iron in the slag, are selectively and efficiently removed and recovered in a low carbon alloy. That is to say the activity of the silicon reducing agent is such that the manganese and iron values are readily reduced to the metallic state whereas the silica present in the ferromanganese slag is unreduced and held back. Thus the absence of competing reactions, such as occurs for example when carbon is used as the sole reluctant, makes possible what is practically complete (80% or more) recovery of manganese from ferromanganese slag. Also, the utilization of reducing agent is highly efficient since practically all of the reductant is employed in obtaining the desired metal values, i.e. Mn, Si and Fe. This feature also represents an advantage over the use of carbon as the sole reductant.

By metallic silicon in the present disclosure is meant silicon in essentially elemental form or as a silicon-iron alloy containing at least 93% silicon.

The use of metallic silicon in the present invention is also advantageous as compared to the use of silicomanganese (75% Mn, 18% Si) as a reducing agent since a manganese containing reductant has the effect of holding back the manganese in the ferromanganese slag and thus prevents a high recovery of metallic manganese. An additional advantage of the present invention is that very low carbon alloys can be recovered, e.g. less than .05% carbon since no Mn, Si or Fe carbides are formed in the metallic phase.

As previously mentioned, the silicon reducing agent of this invention can be alloyed or mixed with up to about 7% iron. The iron content in such an instance is for the purpose of providing the ferromanganese-silicon alloy with a predetermined iron content which can range from 2–6%. Also, as previously mentioned, lime should be added to the furnace charge to provide a lime-silica molar ratio of 0.8 to 1.2 in the reaction throw-away slag, i.e. slag at completion of the silicon reduction-reaction.

It has been found, in the practice of the present invention, that ferromanganese-silicon containing 28%–34% silicon, a maximum of 0.05% carbon and practically free of phosphorous can be readily produced without any special processing techniques or equipment being required.

The silicon level in the alloy can be closely controlled by routine adjustment of charge materials and high power density electrode operations can be employed. Further relatively low operating temperatures can be used and the product metal and throw-away slag can be easily separated.

Also, conventional process equipment is suitable and duplication of equipment is avoided.

Moreover, high rates of production, high recoveries of manganese and significant cost advantages are obtained in comparison with ore-reduction techniques, in addition to the benefit of low carbon and low phosphorous content in the product alloy.

The following examples will further illustrate the present envention.

EXAMPLE I 10,000 lbs. of medium carbon ferromanganese slag having the following composition was used as part of an electric furnace charge.

*Ferromanganese slag*

| | Percent |
|---|---|
| MnO | 25.03 |
| SiO$_2$ | 33.30 |
| CaO | 27.59 |
| Al$_2$O$_3$ | 7.68 |
| MgO | 4.28 |
| FeO | 0.57 |

The ferromanganese slag was sized (4" x D) mixed with metallic silicon (95.01% Si, 4.47% Fe) sized 1" x D and introduced into an electric furnace. The amount of silicon alllloy was 1,385 lbs.

Lime, in the amount of 1,850 lbs. was also added to the charge and the mixture was heated to melt the charge and react the ferromanganese slag and silicon.

The electric furnace used had a single electrode, 35" in diameter, and the crucible was lined with amorphous carbon and fire brick. The crucible was approximately 10' in diameter and 5' deep. The ratio of electrode area to hearth area was 0.09. During operation, the electrode power density was about 6.5 kw. per in.$^2$.

The reaction proceeded in the molten state at a temperature of about 1400° C. to provide metal and slag phases which were easily separated when tapped. Analysis of the metal product and reaction throw-away slag are shown below:

*Alloy*

| | Percent |
|---|---|
| Mn | 64.21 |
| Si | 30.82 |
| Fe | 4.32 |
| C | 0.042 |
| P | 0.031 |

*Throw-away slag*

| | |
|---|---|
| MnO | 3.90 |
| SiO$_2$ | [1] 40.19 |
| CaO | [1] 44.32 |
| MgO | 4.11 |
| Al$_2$O$_3$ | 7.38 |

[1] Lime to silica ratio=1.04.

The amount of metal recovered was 2,470 lbs. and the ratio of slag to metal was 4.21. This indicates that 81.7% of the manganese in the starting ferromanganese slag was recovered in the ferromanganese-silicon alloy product. The throw-away slag contained 16.3% of the original manganese in the ferromanganese slag. The total power consumption was 4200 kw.-hrs.

In a further embodiment of the present invention, a portion of the metallic silicon in the furnace charge is replaced with carbon e.g. coal having at least the equivalent reducing power as hereinafter described. In this latter embodiment lime can be eliminated since the carbon reductant reduces a portion of the silica in the ferromanganese slag and the lime content of the starting ferromanganese slag is sufficient to ensure a suitable lime to silica ratio in the final throw-away slag. The fact that additional lime need not be added provides a much lower slag to metal ratio which in addition to effectively increasing furnace capacity also provides higher recoveries of manganese since there is less likelihood of manganese being entrapped in the lesser volume of slag.

In practicing the silicon-carbon embodiment of the present invention, from 30% to 60% of the theoretically indicated amount of silicon metal reducing agent required to reduce substantially all of the manganese and iron values of the starting ferromanganese slag to the metallic state and provide an alloy having 28%–34% Si, is replaced with an amount of carbon having at least equivalent reducing power to the replaced silicon.

In the reduction of the manganese and iron values from ferromanganese slag 0.86 lb. of carbon (approximately 1.1 lbs. of coal) has a reducing power equal to 1 lb. of silicon.

By way of example, if in a given instance the total theoretical amount of silicon which would be required to reduce substantially all the iron and manganese values in ferromanganese slags and to provide a 28%–34% silicon alloy is 1000 lbs. Then, for example 600 lbs. of the silicon could be replaced with about 515 lbs. of carbon (660 lbs. of coal). The furnace charge could then contain 400 lbs. of silicon and 660 lbs. of coal. Preferably, about 1.2× this theoretically indicated amount of coal would be used, i.e. about 795 lbs. of coal, with 400 lbs. of silicon.

While on the average, about 40% more electric power is required in the practice of the silicon-carbon embodiment of this invention, there is an overall advantage in that significantly more manganese is recovered and a lower overall cost is achieved.

At least 40% of the theoretical amount of silicon required to reduce subsatntially all of the manganese and iron values and provide a 28%–34% silicon alloy is required in the furnace charge in order to insure high manganese recovery from the ferromanganese slag.

The following example will further illustrate this latter embodiment of the present invention.

EXAMPLE II

Using the same equipment as in Example I, 10,000 lbs. of medium-carbon ferromanganese slag having the following composition was used as part of an electric furnace charge.

*Ferromanganese slag*

| | Percent |
|---|---|
| MnO | 25.77 |
| CaO | 27.98 |
| $SiO_2$ | 32.40 |
| MgO | 4.01 |
| $Al_2O_3$ | 7.96 |
| FeO | .26 |

The ferromanganese slag was crushed to 4″ x D mixed with 600 lbs. of silicon sized 1″ x D and 1,100 lbs. of metallurgical grade coal and the mixed material was introduced into the electric furnace. The analysis of the coal is shown in the table below.

*Analysis of New River Coal*

| | Percent |
|---|---|
| Volatiles | 15.1 |
| Ash | 3.63 |
| Fixed carbon | 81.27 |
| Moisture (approx.) | 5 |

No lime was added to the charge and the mixture was heated to about 1400° C. to react the charge materials. The reaction proceeded and provided metal and slag phases which were separated when tapped. The electrode power density was the same as in Example I and the total power consumption was 6000 kw.-hrs.

Analysis of the metal product and reaction throwaway slag are shown below:

*Alloy*

| | Percent |
|---|---|
| Mn | 64.58 |
| Si | 31.06 |
| Fe | 3.81 |
| C | .046 |
| P | .037 |

*Throw-away slag*

| | Percent |
|---|---|
| MnO | 5.1 |
| $SiO_2$ | [1] 36.9 |
| CaO | [1] 40.4 |
| MgO | 5.7 |
| $Al_2O_3$ | 11.5 |

[1] Lime to silica ratio=1.03.

The amount of metal recovered was 2,610 lbs. and the ratio of slag to metal was 2.6. This indicates that 84% of the manganese in the starting ferromanganese slag was recovered in the ferromanganese-silicon alloy product. The throw-away slag contained 13% of the original manganese in the ferromanganese slag.

What is claimed is:

In a process for the manufacture of ferromanganese-silicon by the reaction of a charge of manganese-bearing material with a silicon reducing agent, the improvement for producing a ferromanganese-silicon alloy having a composition of about 60 to 66% Mn, 28 to 34% Si, a maximum of about 0.05% C, balance essentially iron, said improvement comprising:

(1) employing as the manganese-bearing material a ferromanganese slag containing about 20 to 28% MnO, 28 to 35% $SiO_2$, 6 to 8% $Al_2O_3$, 25 to 30% CaO, 1 to 3% MgO and 0.5 to 1% FeO, (2) replacing between about 30 and 60% of the silicon reducing agent with carbon having at least the equivalent reducing power in the reduction of manganese and iron from ferromanganese slag, (3) employing a silicon reducing agent containing at least 93% silicon, (4) heating the furnace charge to cause reaction thereof at a temperature between about 1400° C. and 1600° C. to form a metal and slag phase, (5) separating the metal from the slag phase when the manganese content in the slag phase is between 3 and 5%.

References Cited

UNITED STATES PATENTS

| 1,543,321 | 6/1925 | Danieli et al. | 75—133.5 |
| 1,835,925 | 12/1931 | Becket | 75—130.5 |
| 1,863,642 | 6/1932 | Stimson et al. | 75—80 X |
| 1,901,367 | 3/1933 | Gustaffson | 75—130.5 X |
| 2,280,041 | 4/1942 | Vignos | 75—133.5 |
| 2,546,936 | 3/1951 | Vignos | 75—30 |
| 2,549,994 | 4/1951 | Udy | 75—80 X |
| 2,775,518 | 12/1956 | Udy | 75—133 |
| 2,830,890 | 4/1958 | Udy | 75—11 |
| 2,830,891 | 4/1958 | Udy | 75—11 |
| 3,024,105 | 3/1962 | Kuhlman | 75—133.5 |
| 3,037,856 | 6/1962 | Udy | 75—80 X |

DAVID L. RECK, *Primary Examiner.*

H. W. TARRING, *Assistant Examiner.*